May 12, 1931.  W. B. WIGLE  1,804,581

STUFFING BOX

Filed March 26, 1929

INVENTOR
WILSON B. WIGLE.

ATTORNEY.

Patented May 12, 1931

1,804,581

UNITED STATES PATENT OFFICE

WILSON B. WIGLE, OF COMPTON, CALIFORNIA

STUFFING BOX

Application filed March 26, 1929. Serial No. 349,997.

This invention relates more specifically to a device for automatically taking up the wear on packing or stuffing boxes, glands and the like structures.

In pumping wells, especially oil wells, the control heads are usually provided with stuffing boxes on their upper end through which passes the "polish" rod of the connected pump sucker rods. As the packing material is subject to excessive wear due mainly to continuous pumping operations, the leakage of oil from the stuffing boxes is considerable, entailing quite a financial loss, further the derrick floor around the well becomes unduly saturated and dirty.

By means of my simple device the constant wear on the packing elements occasioned by continuous pumping operations is provided for, the spring tension amply compensating for packing wear.

In the drawings wherein a single embodiment of my invention is shown by way of example;

Figure 1:
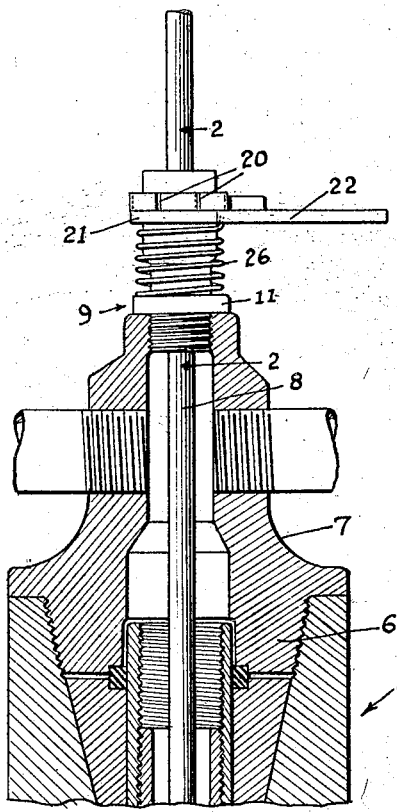
Fig. 1 is a vertical section through the upper end of a control head showing my improved stuffing box device mounted thereon.

Referring now more specifically to the drawings, 5 indicates the upper end of a control head of usual design that is attached to the upper end of a string of well casing (not shown). The bore in the upper end of the head is conical and threaded for the reception of the lower conical threaded end 6 of the bored vented head member 7, the "polish" rod 8 of the pumping string passing therethrough.

To the upper internally threaded opening in member 7 is attached the stuffing box 9, consisting of a lower cylindrical member 10 provided with a circular flange 11 and a circular bore 12 of slightly greater diameter than the "polish" rod that passes therethrough, said bore merging into an upper counterbore 13 of greater diameter for the reception of the packing elements 14. The upper member 15 of the stuffing box has a cylindrical bore 16 at its upper end for the passage of the "polish" rod, and an enlarged lower cylindrical bore 17 internally threaded for engaging the upper externally threaded end of the lower member when the two members are assembled.

Figure 2:
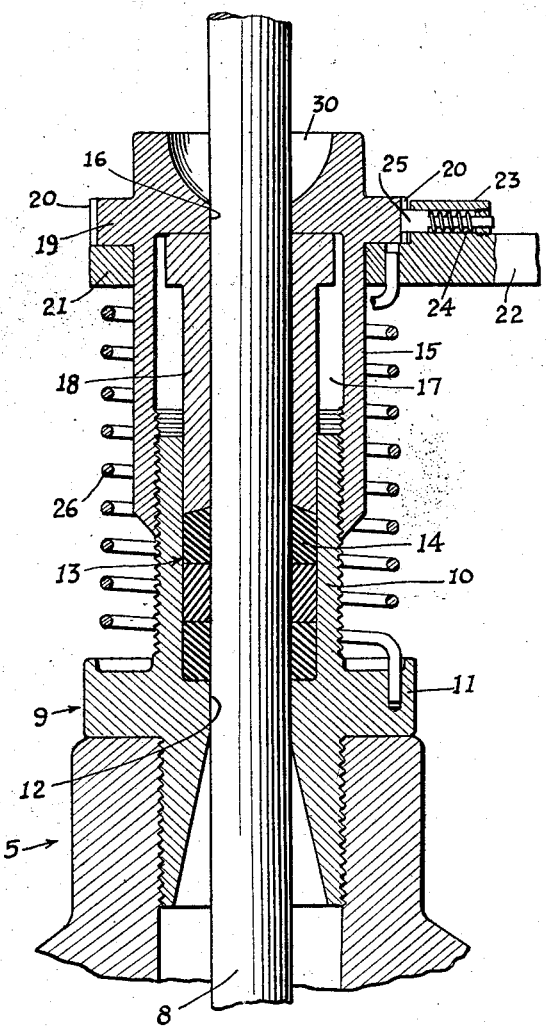
Fig. 2 is an enlarged longitudinal section through the stuffing box.
Figure 3:
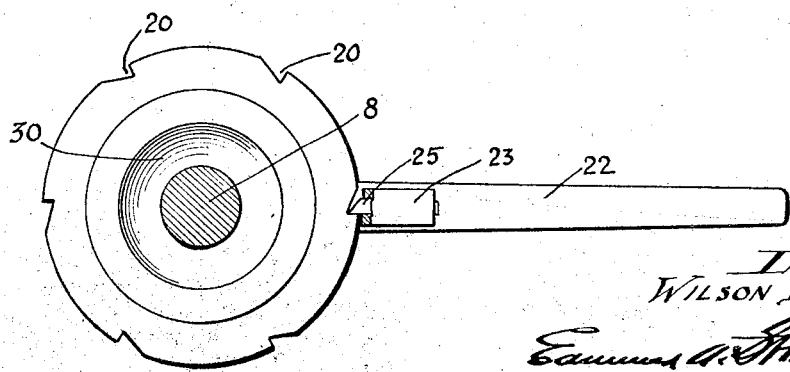
Fig. 3 is a plan view of the stuffing box.

Mounted in the bore 17 of the upper member is a gland 18 of usual form whose lower end bears against the packing elements 14 in the bore of the lower box member. The upper end of member 15 is also provided with a circular flange 19 provided at spaced intervals around its periphery with a plurality of ratchet teeth 20. Disposed below the flange 19 and bearing thereagainst is a circular rotatable ring 21 provided with a handle 22 for operating the same. This handle at its junction with the ring carries a housing 23 in the bore 24 of which is mounted a spring pressed ratchet dog 25 for engaging the ratchet teeth 20 on the flange of the upper member when it is desired to rotate the same to increase the tension of a coiled spring 26, said spring being interposed between the ring 21 and the flange 11 of the lower stuffing box member. The lower end of spring 26 is made fast in any suitable manner to the flange 11 of the lower box member and its upper end to the ring 21, as clearly shown in Fig. 2 of the drawing. In order to provide for oil overflow or drippings from the "polish" rod during a pumping operation, a semicircular cavity 30 is formed in the upper end of member 15.

From the above description it is thought that the operation of the device will be clearly apparent. After installation the spring is wound tightly through the medium of the ring 21 and its handle, the ratchet dog engaging one of the teeth 20 in the flange maintaining the spring in its wound condition. As the spring recoils or unwinds due to packing wear, the upper box member 15 will be screwed downwardly forcing the gland against the packing elements to expand the same in fluid tight engagement with the polish rod of the pump. As the packing elements only require a slight pressure to keep them in tight engagement with the pump rod it will only be necessary to rewind the spring at long intervals.

From the above it will be clear that all wear of the packing elements will at all times be adequately provided for, and little if any oil will be wasted in pumping operations.

I claim:

1. A stuffing box construction comprising a lower bored member for the reception of packing elements, said member having a concentric counterbore for the passage of a pump rod, a gland member engaging said packing elements, an upper bored member engaging the lower member, a coiled spring interposed between said upper and lower box members, means to wind said spring to increase its tension, and means to maintain the tension in the spring after a winding operation, whereby as the packing elements wear the spring will rotate the upper box member downwardly to compress the packing elements.

2. A stuffing box for deep well pumps comprising a body member adapted for attachment to the upper end of a well control head, said member having a bore for the passage of a pump rod and a concentric counterbore thereabove for the reception of a packing element, a packing element mounted in said counterbore, a gland member engaging the packing element, a cap member threadingly engaging the body member and having a bore in its upper end for the passage of the pump rod, the upper end of said cap member provided around its periphery with a plurality of ratchet teeth, a rotatable ring disposed on said cap member below the ratchet teeth having an operating handle and a ratchet dog for engaging the teeth on the cap member, and a coiled spring surrounding the body and cap members, the upper and lower ends of the spring being fastened to the rotatable ring and body member respectively, whereby as the packing element wears the spring will automatically rotate the cap member downwardly to compress the packing.

In testimony whereof I affix my signature.

WILSON B. WIGLE.